United States Patent
Maguire et al.

(10) Patent No.: US 8,275,844 B2
(45) Date of Patent: Sep. 25, 2012

(54) SYSTEM AND METHOD FOR AN EXTENDABLE MOBILE COMMUNICATIONS DEVICE USER INTERFACE

(75) Inventors: Michael Maguire, Waterloo (CA); Krishna K. Pathiyal, Coral Springs, FL (US)

(73) Assignee: Research In Motion Limited (CA)

( * ) Notice: Subject to any disclaimer, the term of this patent is extended or adjusted under 35 U.S.C. 154(b) by 0 days.

(21) Appl. No.: 12/887,758

(22) Filed: Sep. 22, 2010

(65) Prior Publication Data
US 2011/0010639 A1 Jan. 13, 2011

Related U.S. Application Data

(63) Continuation of application No. 11/237,010, filed on Sep. 28, 2005, now Pat. No. 7,805,729, which is a continuation of application No. 09/897,207, filed on Jul. 2, 2001, now Pat. No. 6,990,672.

(60) Provisional application No. 60/215,605, filed on Jun. 30, 2000.

(51) Int. Cl.
*G06F 15/16* (2006.01)
(52) U.S. Cl. .................. 709/206; 715/808; 715/841
(58) Field of Classification Search .................. 709/206; 715/808, 841
See application file for complete search history.

(56) References Cited

U.S. PATENT DOCUMENTS

| | | | |
|---|---|---|---|
| 6,005,942 A | 12/1999 | Chan et al. | |
| 6,282,294 B1 | 8/2001 | Deo et al. | |
| 6,292,833 B1 | 9/2001 | Liao et al. | |
| 6,421,717 B1 | 7/2002 | Kloba et al. | |
| 6,553,223 B1 | 4/2003 | Bayley et al. | |
| 6,684,269 B2 | 1/2004 | Wagner | |
| 7,010,616 B2 * | 3/2006 | Carlson et al. ................ | 709/246 |
| 7,054,464 B2 | 5/2006 | Poor | |
| 2002/0046343 A1 | 4/2002 | Deo et al. | |
| 2002/0156938 A1 | 10/2002 | Wong et al. | |
| 2003/0097361 A1 | 5/2003 | Huang et al. | |
| 2005/0027802 A1 * | 2/2005 | Madsen et al. ................ | 709/204 |
| 2005/0044148 A1 | 2/2005 | Son et al. | |
| 2006/0026603 A1 | 2/2006 | Maguire et al. | |

OTHER PUBLICATIONS

Canadian Office Action for CA Application Serial No. 2,352,024 mailed Mar. 2, 2007; 2 pages.
Canadian Office Action for CA Application Serial No. 2,352,024 mailed Apr. 27, 2005; 2 pages.
U.S. Appl. No. 11/237,010; Non-Final Office Action; Date Filed: Sep. 28, 2005; Mail Date: Oct. 19, 2009; pp. 1-8.
U.S. Appl. No. 11/237,010; Notice of Allowance; Date Filed: Sep. 28, 2005; Mail Date: May 26, 2010; pp. 1-6.
Canadian Office Action for CA Application Serial No. 2,352,024 mailed Feb. 2, 2004; 2 pages.
U.S. Appl. No. 09/897,207; Non-Final Office Action; Date Filed: Jul. 2, 2001; Date Mailed: Mar. 18, 2005; pp. 1-12.

(Continued)

*Primary Examiner* — Andy Ho
(74) *Attorney, Agent, or Firm* — Cantor Colburn LLP

(57) ABSTRACT

A system and method for an extendable software interface includes a software architecture for use in a mobile device having a processor and a memory device. The software architecture includes a set of first-order controller software instructions configured to interface the application program with a first-order data model, and a first-order data object stored in the memory device in the form of the first-order data model. The first-order data object includes a second-order data object. A second-order set of controller software instructions configured to interact with the second-order data object is also included in the software architecture.

15 Claims, 9 Drawing Sheets

OTHER PUBLICATIONS

U.S. Appl. No. 09/897,207; Notice of Allowance; Date Filed: Jul. 2, 2001; Date Mailed: Jul. 6, 2005; pp. 1-4.
U.S. Appl. No. 13/244,793; Non-Final Office Action; Date Filed: Sep. 25, 2011; Mail Date: Nov. 21, 2011; pp. 1-6.
U.S. Appl. No. 13/244,793; Notice of Allowance; Date Filed: Sep. 25, 2011; Mail Date: Mar. 26, 2012; pp. 1-7.

* cited by examiner

```
From: David Wilder <DWilder@rim.net>
To: Mark Geek <MGeek@rim.net>; Chuck Michaels
<CMichaels@rim.net>; Krishna Paliath <kpaliath@rim.net>
Subject: RE:RE: Important Document I think we should meet to discuss this.

Dave

-----Original Message-----

From: Mark Geek
Sent: Thursday, June 08, 2000 11:26 PM
To: Chuck Michaels; Krishna Paliath; David Wilder
Subject: RE: Important Document
Importance: High Gentlemen:

Have you seen the attached document?

Mark

-----Original Message-----
From: Ulf Makra <ulf@bigcompany.com>
Sent: Thursday, June 07, 2000 11:26 PM
To: Mark Geek
Subject: Important Document
Importance: High Mark
    I am forwarding by courier an important document
  for your review.
  Ulf
```

400

410

412

- Add Ulf to address book
- New email message to Ulf
- New email message and
   add to address book
- Cancel

Fig. 7

SYSTEM AND METHOD FOR AN EXTENDABLE MOBILE COMMUNICATIONS DEVICE USER INTERFACE

CROSS-REFERENCE TO RELATED APPLICATIONS

This application is a continuation of U.S. patent application Ser. No. 11/237,010, filed on Sep. 28, 2005 (now U.S. Pat. No. 7,805,729), which is a continuation of U.S. patent application Ser. No. 09/897,207, filed on Jul. 2, 2001, (now U.S. Pat. No. 6,990,672), which claimed priority from U.S. Provisional Application No. 60/215,605, filed Jun. 30, 2000. These prior applications, including their entire written descriptions and drawing figures, are hereby incorporated into the present application by reference.

BACKGROUND

1. Field of the Invention

This invention relates generally to a software interface for a mobile device. More particularly, the invention provides an extendable software interface enabling forward compatibility in a mobile device, such that new applications may be easily integrated into the mobile device. This invention is particularly well-suited for use in Personal Digital Assistants, mobile communication devices, cellular phones, and wireless two-way email communication devices (collectively referred to herein as "mobile devices").

2. Description of the Related Art

Typical mobile device interfaces are constrained by resource limitations on the mobile device as compared to those of a desktop system. As a result of these constraints, known mobile device interfaces are generally either hard-wired or hard-coded. In either case, the known mobile device interfaces are immutable once the mobile device has been manufactured. For instance, in a hard-wired mobile device, physical components, such as push buttons and displays, are generally integrated into a user interface by control logic wired into a printed circuit board. Consequently, a hard-wired mobile device is not capable of being upgraded to support new applications. In a hard-coded mobile device, a programmable device is typically used for the control logic, and the user interface is generally controlled by the firmware and/or operating system of the mobile device. New applications can generally be added to a hard-coded mobile device, but this process typically involves replacing or upgrading the interface software, which often involves a risk of breaking compatibility with legacy features of the mobile device. In addition, neither hard-wired nor hard-coded mobile devices typically allow a user to seamlessly interface between an application program and data types associated with other application programs.

SUMMARY

A system and method for an extendable software interface includes a software architecture for use in a mobile device having a processor and a memory device. The software architecture comprises a plurality of application programs stored in the memory device and executed by the processor, and at least one controller module for interfacing the plurality of application programs with a data model configured to interact with a particular type of data object. Each controller module utilizes one or more generic interfaces with the plurality of application programs, and also utilizes a specific interface with the data model.

BRIEF DESCRIPTION OF THE DRAWINGS

FIG. 7 illustrates an implementation of the extendable software interface that adds functionality to an e-mail message application;

DETAILED DESCRIPTION

Figure 1:
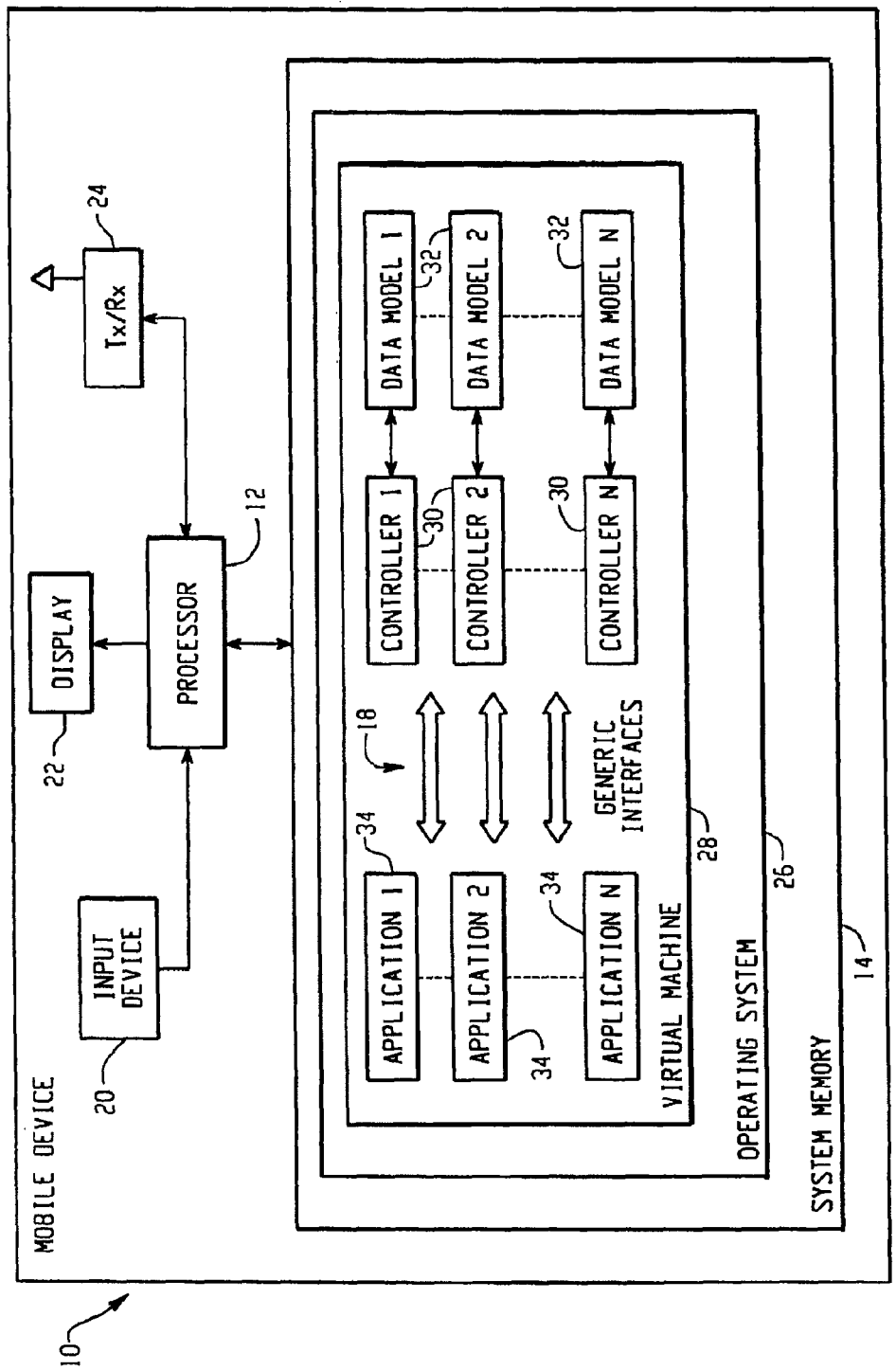
FIG. 1 is a block diagram showing a mobile device with an exemplary extendable software interface.

Referring now to the drawing figures, FIG. 1 is a block diagram showing a mobile device 10 with an exemplary extendable software interface. The mobile device comprises a processor 12 coupled to a system memory 14, an input device 20, a display 22, and a transceiver 24. Within the system memory 16 is an operating system 26 that includes a virtual machine 28. The virtual machine 28 operates using two types of software modules, controllers 30 and data models 32, that interface with application programs 34 through a plurality of generic interfaces 18.

Operationally, the software interface of the mobile device 10 is extended using the software modules 30 and 32, and the generic interfaces 18. The software modules 30 and 32 are executed by the virtual machine 28, which is preferably an object oriented run-time environment such as Sun Micro System's J2ME (JAVA® 2 Micro Edition). The software modules 30 and 32 are preferably constructed using a JAVA® compiler capable of enforcing a software application interoperation architecture that takes on the form of a collection of compiled classes and objects along with an application programming interface (API).

Data models 32 are classes that represent the various types of data stored on the mobile device 10. The types of data may include, for example, e-mail messages, address book entries, calendar items, tasks, and memos. In addition, next-generation mobile devices may store data such as SMS messages, phone call logs, voice mail indicators, WAP requests, multiple e-mail sources, HTML content exchanges, specialized banking services, financial services, field server and customer service offerings, or downloads from corporate databases.

The data models 32 are preferably stored on the mobile device 10 in the form of Java objects for execution in the J2ME run time environment. Each data model 32 is designed for a particular type of data object, and includes specialized functions for retrieving information associated with the data type. For example, an e-mail message model may have specialized functions for retrieving the subject of the e-mail object and for retrieving the body of the e-mail object. A calendar entry model, on the other hand, may include specialized functions specific to a calendar entry object, such as a function capable of retrieving the duration of an appointment.

Each type of data model 32 has an associated controller 30 capable of interacting with the specific functions of the data model 32 type and representing the data model 32 in a uniform way to the rest of the software interface system. Operationally, the controllers 30 isolate the data models 32 from the generic interfaces 18, and implement the generic interfaces 18 such that each controller 30 can be easily hosted by any application program 34 that supports the generic interfaces 18. In this manner, the controllers 30 present a common, standard interface to any application 34; and each application that supports the generic interfaces 18 is able to interact with any arbitrary controller 30. For example, an e-mail application using one or more of the generic interfaces 18 can interface with an address book controller to retrieve an e-mail address from an address book data model. Moreover, existing controllers 30 can be used to interface with any new applications supporting the generic interfaces 18. In this manner, a mobile device user is able to install new applications without having to upgrade his or her operating system 26 or interface software 28. The flexibility provided by the interoperability of the controllers 30 may also enable the mobile device user to expand the functionality of his or her mobile device 10 by interacting with third party applications, such as banking or other commercial services.

The interaction between an application program 34 and any arbitrary controller 30 is primarily made possible by generic interfaces 18 that are implemented each controller 30. The generic interfaces 18 are generic in the sense that they are object-oriented as opposed to being specific to a certain type of data. Put another way, each generic interface 18 is preferably programmed to perform a certain operation regardless of the data type. Operationally, each application 34 is preferably programmed to query any controller 30 to determine if the controller 30 supports one or more generic interfaces 18 required to perform a given operation. If so, the application 34 then interacts with the controller 30 and its associated data model 32 to complete the operation. For instance, an application 34 may query a controller 30 to determine whether it supports a generic interface 18 capable of painting an object (such as the body of an e-mail message) onto a screen, and if so, then interface with an controller 30 to display the object. In this manner, the same type of generic interface 18 that is used by an application 34 to display the body of an e-mail message could also be used, for example, to display a clipping from a lengthy SMS message. In another example, the same generic interface 18 used to display the e-mail message may also be used to receive an e-mail address from an e-mail controller and interface with an address book application to paint the address into an address file. Preferably, new controllers could also be implemented that support new generic interfaces. Therefore, new controllers can easily be designed to interface with upgraded applications supporting new functions, and still be compatible with older applications as long as the new controller includes the older generic interfaces.

Three exemplary generic interfaces that may be implemented by a controller 30 are briefly described below. It should be understood, however, that these are just a few examples of the many types of generic interfaces that could be used within the system shown in FIG. 1.

1. PaintProvider—The Paint Provider interface supports painting a data model 32 into a given region of an application program 34. For example, this generic interface 18 could be used to instruct a controller to paint a data model into a list view. The PaintProvider interface may be implemented as follows:

```
public interface PaintProvider
{
    void paint(Object model, Graphics g, int x, int y,
        int width, int height, Object context);
}
```

2. FieldProvider—The FieldProvider interface enables a controller 30 to provide an application program 34 with a read-only or editable field from a data model 32. For instance, the FieldProvider interface may enable a data model 32 to be displayed in a list of fields, such as in the edit screen of an email message. The FieldProvider interface may be implemented as follows:

```
public interface FieldProvider
{
    Field getField(Object model, Object context) throws
        NoFieldException;
    void grabDataFromField(Object model, Field field);
}
```

3. VerbProvider—The VerbProvider interface enables a controller 30 to supply an array of "verbs" when a user selects an object associated with a data model 32. For instance, when a user positions a cursor over an object (such as a portion of text) associated with a particular data model, the VerbProvider interface may display a list of menu selections specific to that data model. The VerbProvider interface may be implemented as follows:

```
public interface VerbProvider
{
    Verb [ ] getVerbs(Object model, Object context);
    Verb [ ] getDefaultVerb(Object model, Object context);
}
```

Figure 2:
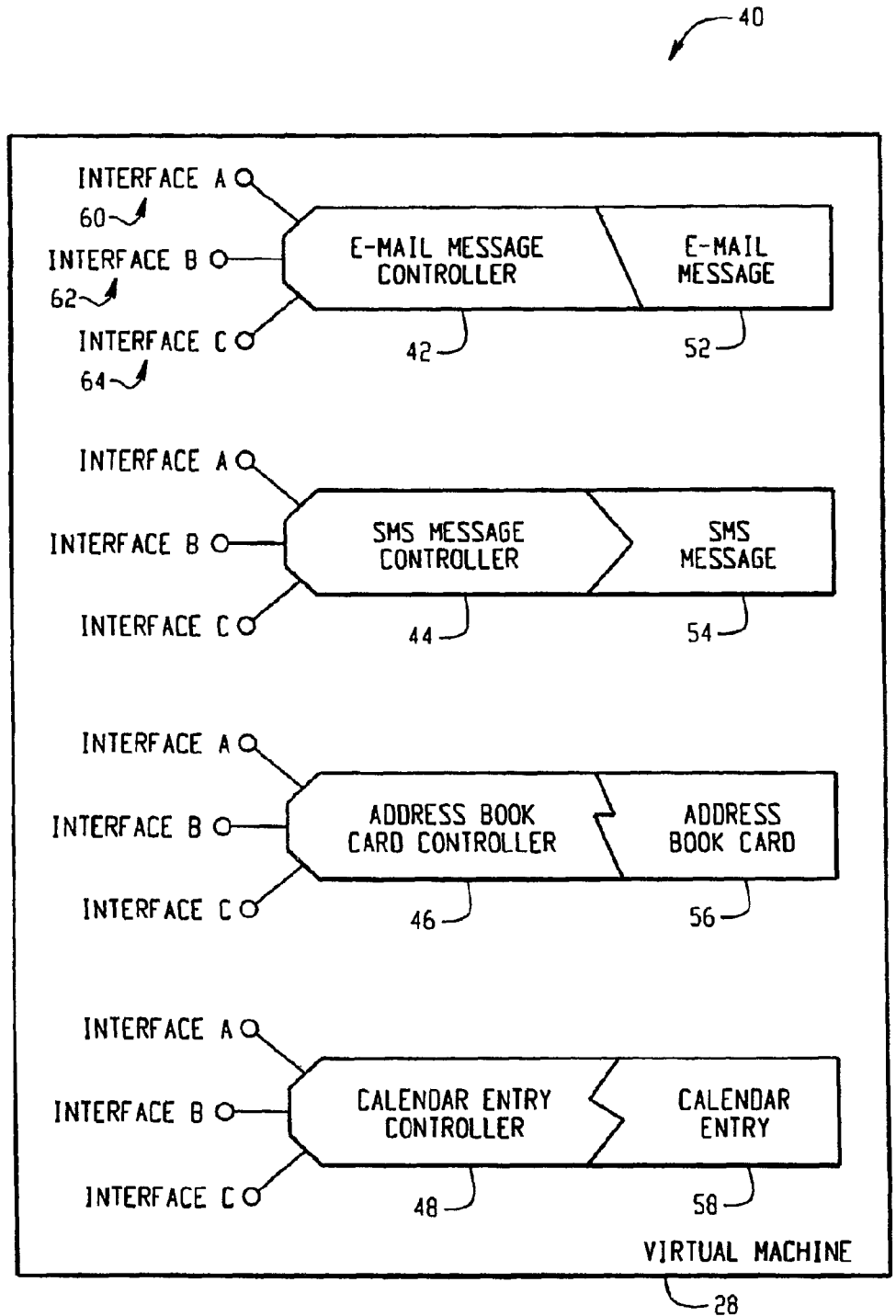
FIG. 2 is a block diagram illustrating the interaction between four exemplary controllers and four exemplary data models.

FIG. 2 is a block diagram 40 illustrating the interaction between four exemplary controllers 42, 44, 46 and 48, and four exemplary data models 52, 54, 56 and 58. The exemplary controllers shown in the diagram 40 include an e-mail message controller 42, an SMS message controller 44, an address book card controller 46, and a calendar entry controller 48. Each exemplary controller 42, 44, 46, and 48 is unique to a data model type; respectively shown in the diagram 40 as an e-mail message 52, a SMS message 54, an address book card 56, and a calendar entry 58. The uniqueness of the controllers and their corresponding data models is illustrated by the varying shapes at the interface between each exemplary controller 42, 44, 46, and 48 and data model 52, 54, 56, and 58. In addition, each exemplary controller 42, 44, 46, and 48 includes three generic interfaces: Interface A 60, Interface B 62, and Interface C 64. Although every controller 42, 44, 46, and 48 is unique to a data model 52, 54, 56, and 58, the same generic interfaces 60, 62 and 64 are implemented universally throughout the software interface. Therefore, as discussed above with reference to FIG. 1, each exemplary controller 42, 44, 46, and 48 is able to interface with any application program that supports the generic interfaces 60, 62 and 64.

Figure 3:
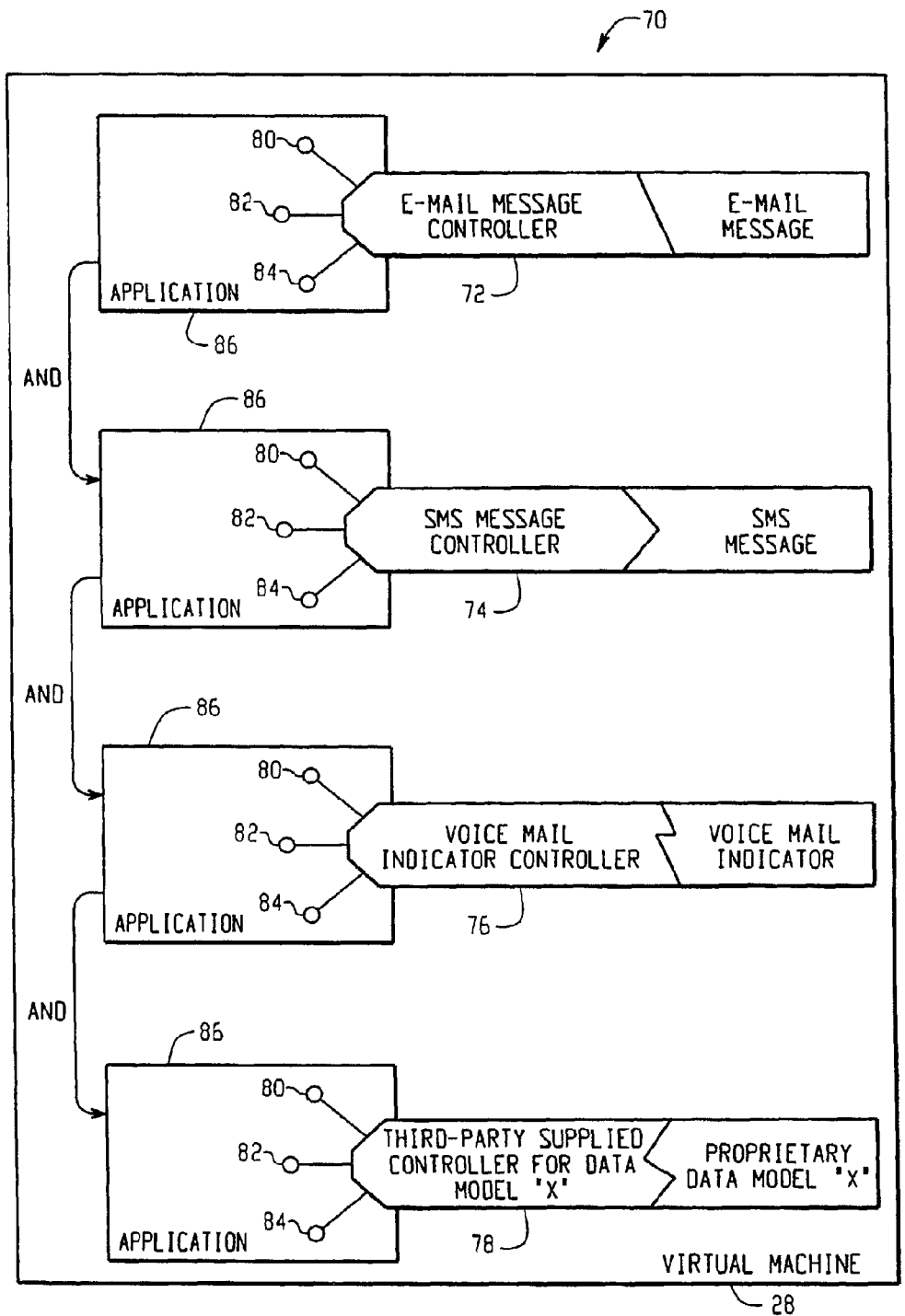
FIG. 3 is a block diagram illustrating that multiple controllers having generic interfaces can each interact with the same application program.

FIG. 3 is a block diagram 70 illustrating that multiple controllers 72, 74, 76 and 78 having generic interfaces 80, 82, and 84 can each interact with the same application program 86. For example, FIG. 3 shows an e-mail message controller 72, an SMS message controller 74, a voice mail indicator controller 76, and a third-party supplied controller 78. Each controller 72, 74, 76 and 78 includes the same three generic interfaces 80, 82 and 84, and thus all four controllers 72, 74, 76 and 78 are able to interact with the same application 86. In this manner, the interface software 28 remains consistent regardless of the data type being accessed. In addition, FIG. 3 demonstrates that a third-party may easily design a new controller 78 that is compatible with the existing software interface system by including the generic interfaces 80, 82 and 84 supported by the application program 86 and other applications on the system.

Figure 4:
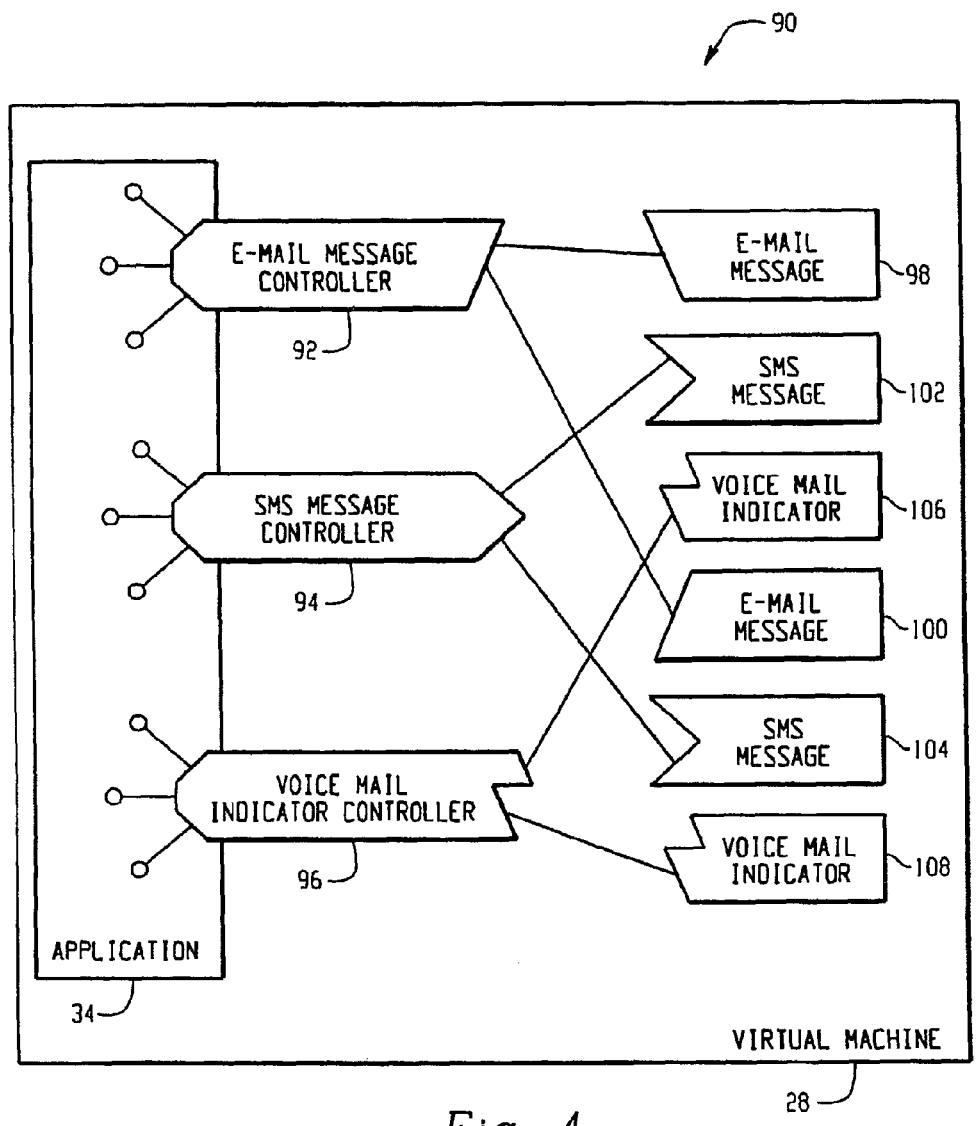
FIG. 4. is a block diagram illustrating that controllers are singletons each capable of interfacing with multiple data modules of the same type.

FIG. 4. is a block diagram 90 illustrating that controllers 92, 94, and 96 are singletons each capable of interfacing with multiple data models of the same type. As data entries or messages are received into the system, they are preferably entered into a persisted list of data objects that is included in, or assessable to, each application program 34. The persisted list should preferably identify a data model for each data object in the list. Since the same type of data model may often be associated with multiple data objects in the list, multiple instances of various data model software modules could be executing in the system at the same time. This is illustrated in FIG. 4 by the multiple instances of the e-mail message data models 98 and 100, the SMS message data models 102 and 104, and the voice mail indicator data models 106 and 108.

In a preferred embodiment, however, the persisted list should not identify a controller 92, 94 or 96 for each data object. Rather, the appropriate controller 92, 94 or 96 is preferably identified as some action is taken with a data model 98, 100, 102, 104, 106 or 108. When an application 34 needs to access a data model, the application 34 preferably (1) queries the data model for the correct controller, (2) calls the controller, and then (3) passes in the data model as the first parameter. In this manner, the controllers 92, 94 and 96 are stateless objects such that only one instance of a controller 92, 94 or 96 is capable of handling all of the data models of a certain type that are executing in the system. For example, in FIG. 4 one instance of an e-mail message controller 92 interfaces with both instances of the e-mail message data model 98 and 100.

Figure 5:
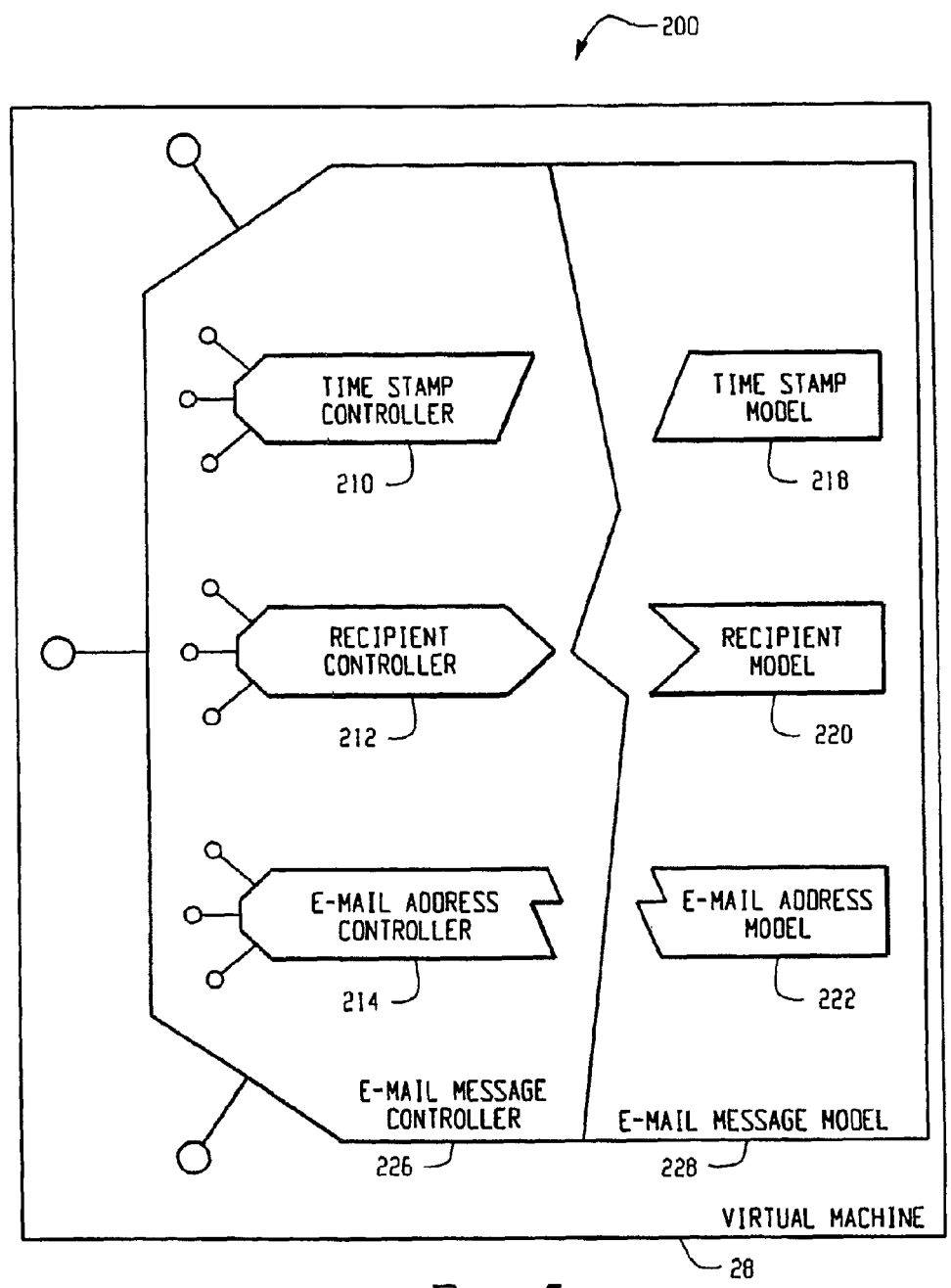
FIG. 5 is a block diagram illustrating exemplary second-order controllers and second-order data models.

FIG. 5 is a block diagram 200 illustrating exemplary second-order controllers 210, 212 and 214 and second-order data models 218, 220 and 222. The controllers and data models illustrated in FIGS. 2-3 are examples of software modules designed to interface with first order objects, such as an e-mail message, an address book entry or a calendar item. In a preferred embodiment, however, the extendable software interface is also capable of interfacing with multiple objects within a first-order object, referred to herein as second-order objects. An example of a second-order object is an address that appears within the body of an e-mail message. In order to interface with a second-order object, the extendable software interface preferably utilizes second-order controllers that operate within a first-order controller. For instance, in FIG. 5 four second-order controllers 210, 212 and 214 are shown within an e-mail message controller 226. Each of the second-order controllers 210, 212 and 214 are preferably programmed to access a particular type of second-order object. FIG. 5 shows one exemplary method by which a second-order controller may access a second-order object. In this embodiment, a second-order data model 218, 220 or 222 is created for each type of second-order object. The second-order data models 218, 220 and 222 preferably operate within a first-order data model 228. In this manner, each second-order data model 218, 220 or 222 is programmed to access a particular type of information within a data type, thus enabling a second-order object to be manipulated by an application program 34 through the second-order controllers 210, 212 and 214. Examples illustrating the manipulation of second-order objects are detailed below with reference to FIGS. 7 and 8.

Figure 6:
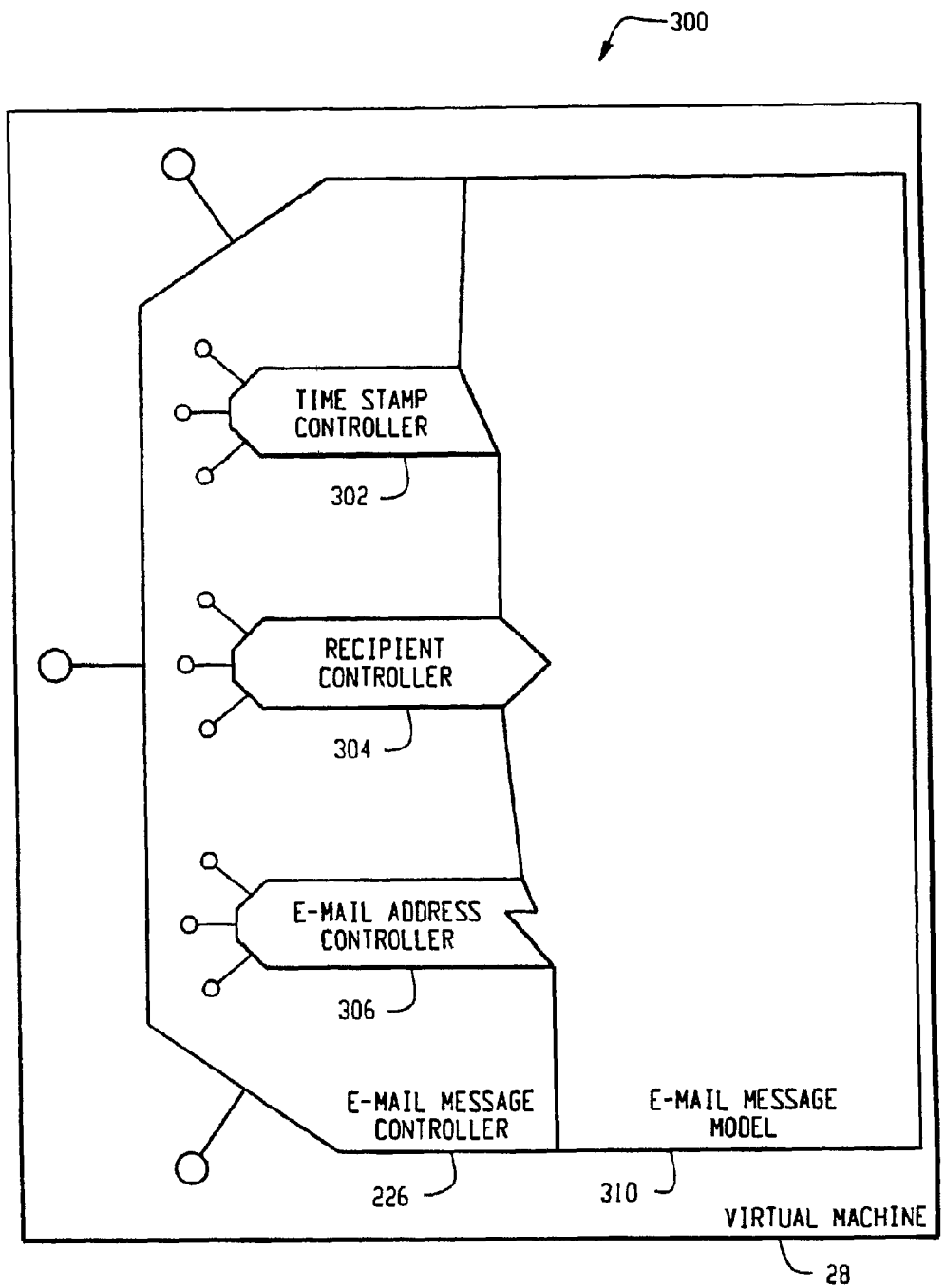
FIG. 6 is a block diagram showing an alternative embodiment in which second-order objects are accessed with second-order controllers and a first-order data model.

FIG. 6 is a block diagram showing an alternative embodiment 300 in which second-order objects are accessed with second-order controllers 302, 304 and 306 and a first-order data model 310. In this embodiment, the first-order data object is grouped by the virtual machine 28 in such a way that second-order data objects can be identified from within the first-order data model 310. This may be accomplished, for example, by grouping a first order data object that includes multiple second-order data objects such that they appear to the system as essentially one immutable object. When the group is accessed by the virtual machine 28, however, each of the sub-pieces (second-order objects) of the group can be independently accessed. The second-order controllers 302, 304 and 306 are then programmed to identify the second-order data objects from within the data object grouping. In this manner, memory space on the system can be better utilized by eliminating the need for second-order data models.

FIG. 7 illustrates an implementation of the extendable software interface that adds functionality to an e-mail message application. In the embodiment shown in FIG. 7, any e-mail addresses that appear in any portion of an e-mail message 400 are action-linked. This may be accomplished, for example, by designing an e-mail message controller capable of (1) recognizing e-mail addresses as second-order objects, and (2) delegating the interface between the e-mail message application and the e-mail address to an object-specific, second-order e-mail address controller operating within the e-mail controller. The e-mail address controller should preferably be capable of retrieving e-mail addresses 410 from a first-order e-mail message model. Alternatively, specialized second-order e-mail address models may be constructed to operate within the e-mail message model and interact with the e-mail address controller. In either case, by defining e-mail addresses 410 as second-order objects, and designing interface software modules capable of retrieving the addresses 410 from within any portion of an e-mail message 400, an existing e-mail application is extended such that it can perform previously unavailable operations.

For instance, with reference to FIG. 7, when a mobile device user positions a cursor in the vicinity of the e-mail address "ulf@bigcompany.com" 410, the e-mail message controller preferably recognizes that the address 410 is a second-order object and calls the specialized second-order e-mail address controller. Through one of the generic interfaces, the e-mail address controller then preferably presents a list of functions 412 on a display of the device that can be performed on the e-mail address 410. In addition, the function list 412 may preferably include operations involving other applications. For example, the function "Add Ulf to address book" may require the e-mail address controller to interface with an address book application. This seamless operation is possible because the generic interfaces enable the e-mail address controller to interface with any application within the system.

Figure 8:
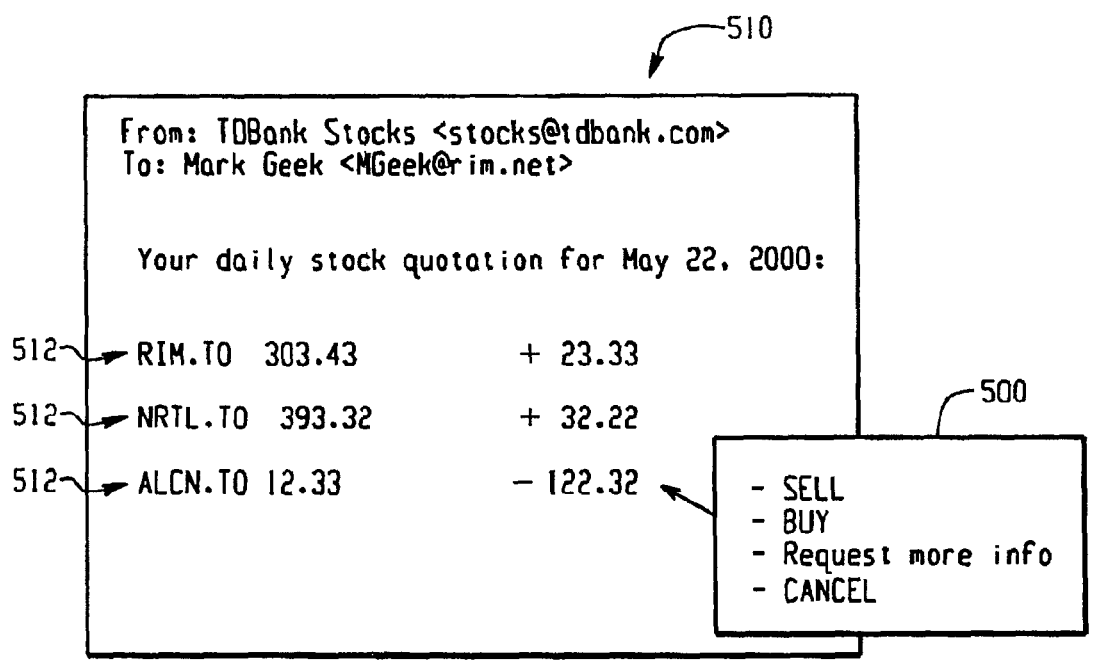
FIG. 8 illustrates an implementation of the extendable software interface that adds third-party stock brokerage functions to the e-mail message application.

FIG. 8 illustrates an implementation of the extendable software interface that adds third-party stock brokerage functions 500 to the e-mail message application. In this example, an e-mail message 510 sent from a stock broker includes action-linked stock quotations 512. In order to implement this example, the mobile device manufacturer, or preferably the third party, may design an e-mail message controller upgrade that adds second-order controllers that are specific to data objects typically found in an e-mail from a stock broker. With reference to the illustration, when a user positions a cursor in the vicinity of a stock quote or ticker symbol 512 in the e-mail message 510, the upgraded e-mail controller preferably (1) recognizes the quote or symbol 512 as a second-order object and (2) calls the object-specific second-order controller. The second-order controller then preferably presents a list of functions 500 to the e-mail message application that are capable of being performed on the object 512. In this example, the available functions are "SELL," BUY," "Request more info," and "Cancel." If, for example, the user selects the "SELL" function from the list 500, then the second-order controller may be programmed to (1) instruct the e-mail application to create a new e-mail message, (2) paint the address "stocks@tdbank.com" into the receiver line (the "To:" line) of the new message, (3) paint the address "MGeek@rim.net" into the sender line (the "From:" line) of the new message, and (4) paint the text "SELL" along with the second-order object "ALCN. TO 12.33-122.21" into the body portion of the new message. Significantly, none of these steps require an upgrade to the e-mail message application. Rather, the extendable software interface preferably enables additional functionality to be added to an existing application with only a simple upgrade to the application's controller.

Figure 9:
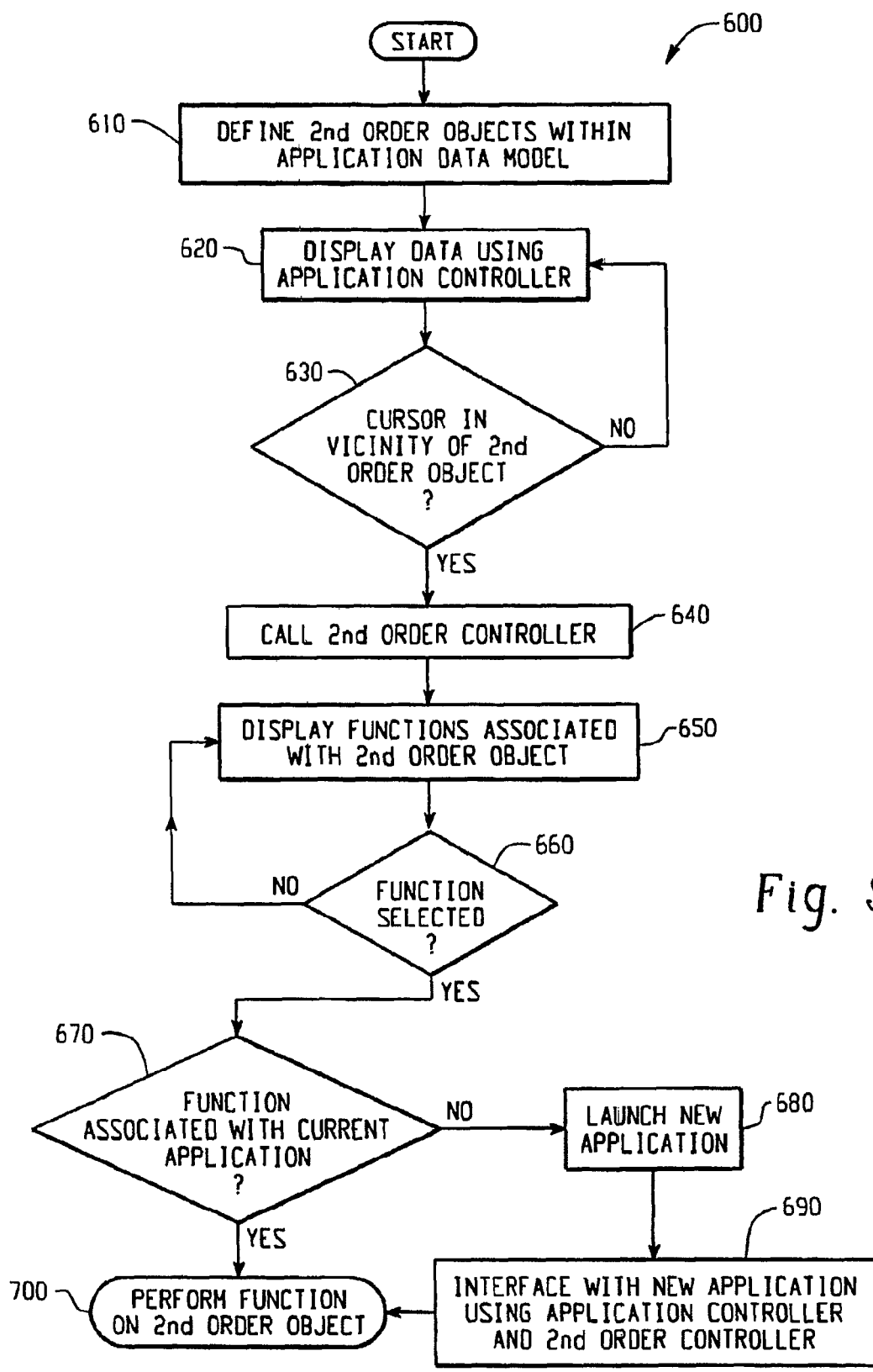
FIG. 9 is a flow diagram showing an exemplary method for adding functionality to an application operating on a mobile device by utilizing the extendable software interface.

FIG. 9 is a flow diagram showing an exemplary method 600 for adding functionality to an application operating on a mobile device by utilizing the extendable software interface. In step 610, one or more second-order objects are defined within the first-order data model associated with the application. For instance, in an e-mail message data model, second-order objects may be defined as described above with reference to FIGS. 7 and 8. It should be understood, however, that this method 600 is not limited to an e-mail messaging application, but may be utilized with any application operating on a mobile device. In step 620, the application data model containing the second-order objects is displayed by the application. As discussed above with reference to FIG. 1, the data model is preferably accessed by the application through generic interfaces and a first-order controller. Once the data is displayed, a mobile device user may preferably select a second-order object by positioning a cursor on, or in the vicinity of, the second-order object (step 630). Alternatively, the second-order object may be selected by any other means available on the mobile device, such as highlighting the object or touching the object with a stylus. When a second-order object is selected by the user, the first-order controller preferably (1) recognizes the object as a second-order object, and (2) calls a second-order controller that is specifically designed to access the second-order object (step 640).

In step 650, the second-order controller preferably provides a list of functions that may be performed on the second-order object. Once a function associated with a second-order object has been selected by the mobile device user (step 660), the second-order controller preferably establishes whether the function (1) relates to the current application, or (2) requires access to another application installed on the mobile device (step 670). For instance, if an address is selected as a second-order object within an e-mail message, then the user may be given the option to (1) insert the address into the "To:" line of a new message, or (2) insert the address into an address book. If the user chooses to compose a new message using the selected address in the "To:" line, then the second-order (address) controller preferably knows that the selected operation relates to the e-mail messaging application that is already executing. Then, the first and second-order controllers may interface with the currently executing application to perform the selected function (step 700). If, however, the user chooses to insert the object into an address book file, then the e-mail message controller and second-order address controller need access to an address book application before the function can be completed. Therefore, when another application installed on the mobile device is required to perform the selected function, the new application is preferably launched by either the first or second-order controller (step 680). Then, because the first and second-order applications utilize generic interfaces, both can interface with the new application to perform the selected function (steps 690 and 700).

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

We claim:

1. A method on a mobile device having a display, comprising:

receiving at the mobile device an electronic message with an e-mail address within a body of the electronic message;

displaying on the display at least a portion of the electronic message including the e-mail address; and in response to a selection of the e-mail address, displaying on the display a function list including at least a first function for interfacing with an address book application, and a second function for interfacing with an e-mail application.

2. The method of claim 1, wherein the electronic message is an e-mail message.

3. The method of claim 1, wherein the electronic message is an SMS message.

4. The method of claim 1, wherein the receiving at the mobile device the selection of the e-mail address comprises receiving a cursor positioning over the e-mail address.

5. The method of claim 1, wherein the first function comprises adding the e-mail address to an address book and the second function comprises creating an e-mail message addressed to the e-mail address.

6. The method of claim 5, further comprising launching an application associated with the selection.

7. A mobile communication device, comprising:

a display;

an input device; and a processor, connected to the display and the input device, and configured to receive an electronic message with an e-mail address within a body of the electronic message, display on the display at least a portion of the electronic message including the e-mail address, and in response to a selection of the e-mail address at the input device, display on the display a function list including at least a first function for interfacing with an address book application, and a second function for interfacing with an e-mail application.

8. The mobile communication device of claim 7, wherein the electronic message is an e-mail message.

9. The mobile communication device of claim 7, wherein the electronic message is an SMS message.

10. The mobile communication device of claim 7, wherein the receiving the selection of the e-mail address comprises receiving a cursor positioning over the e-mail address.

11. The mobile communication device of claim 7, further comprising the processor configured to receive selection of one of the first and second functions.

12. The mobile communication device of claim 11, further comprising the processor configured to launch the application associated with the selected function.

13. The method of claim 7, wherein the interface comprises a menu list.

14. A method of providing functionality on a mobile device having a display, comprising:
  receiving at the mobile device an e-mail message with an e-mail address within a body of the e-mail message;
  displaying on the display at least a portion of the e-mail message including the e-mail address;
  in response to a selection of the e-mail address, displaying on the display a function list including at least a first function for interfacing with an address book application, and a second function for interfacing with an e-mail application; and
  receiving a selection of one of the first and second functions, and then performing the selected function.

15. A mobile communication device, comprising:
  a display;
  a transceiver; and
  a processor connected with the display and the transceiver, the processor configured for:
  receiving with the transceiver an e-mail message having an e-mail address within a body of the e-mail message;
  displaying on the display at least a portion of the e-mail message including the e-mail address;
  in response to a selection of the e-mail address, displaying on the display a function list including at least a first function for interfacing with an address book application, and a second function for interfacing with an e-mail application; and
  receiving a selection of at least one of the at least two functions, and then performing the selected function.

* * * * *